Feb. 6, 1962 HANS-JOACHIM KLEINSCHMIDT 3,020,110

PIVOT BEARING FOR UNIVERSAL JOINTS ESPECIALLY FOR USE
IN CONNECTION WITH UNIVERSAL JOINT SHAFTS

Filed Aug. 27, 1959

INVENTOR.
Hans-Joachim Kleinschmidt
BY
Patent Agent.

3,020,110

PIVOT BEARING FOR UNIVERSAL JOINTS ESPECIALLY FOR USE IN CONNECTION WITH UNIVERSAL JOINT SHAFTS

Hans-Joachim Kleinschmidt, Essen, Germany, assignor to Gelenkwellenbau G.m.b.H., Essen, Germany Filed Aug. 27, 1959, Ser. No. 836,510
Claims priority, application Germany Sept. 11, 1958
3 Claims. (Cl. 308—212)

The present invention relates to a pivot bearing for universal joints, especially for universal joint shafts having a bearing disc arranged between the pivot end and the bottom of the bushing or socket receiving said pivot end.

It is an object of the present invention to provide a pivot bearing of the above mentioned type, which will make it very simple properly to center the above mentioned bearing disc.

It is another object of this invention to provide a pivot bearing of the above character which, while assuring a proper location of the above mentioned bearing disc, will require a minimum of space for the same.

These and other objects and advantages of the invention will appear more clearly from the following specification in connection with the accompanying drawing, in which.

In order to obtain a very simple centering of the bearing disc between the pivot end and the socket receiving same, according to the present invention the pivot end is provided with a recess for receiving and centering the said bearing disc. Such an arrangement not only results in a simple and proper location of said bearing disc but also limits the space for said bearing disc to a minimum.

According to a further development of the present invention, the above mentioned bearing disc may be centered by notched pins mounted in the pivot end whereby the sliding surface of the disc will be definitely determined. In such an instance, it is merely necessary to precision machine two surfaces namely the bottom of the socket and the outer surface of the disc, whereby the costs of production of the pivot bearing are considerably reduced.

Figure 1:
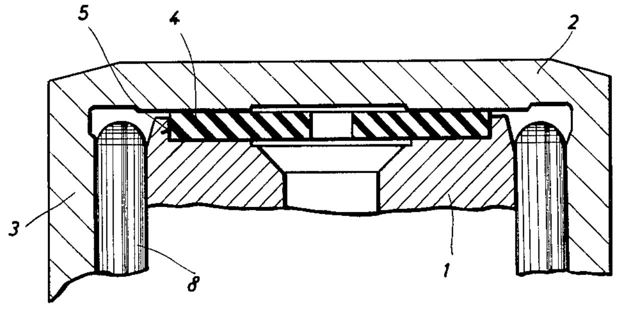
FIG. 1 shows a section through a portion of a pivot bearing according to the present invention.

Referring now to the drawing in detail and FIG. 1 thereof in particular, the arrangement shown therein comprises a pivot 1 which is rotatably journalled in the socket 3 by means of a needle bearing 8. Arranged between the end of pivot 1 and the adjacent bottom 2 of socket 3 is a bearing disc 4 of polyamide or other synthetic material having similar lubricant retaining properties.

In order to be able to center the bearing disc 4 in a simple manner while simultaneously reducing the space required for said disc to a minimum, the end of pivot 1 is, in conformity with the present invention, provided with a recess 5 for receiving and centering the disc 4. Thus, a special centering for the disc 4 will not be necessary.

Figure 2:
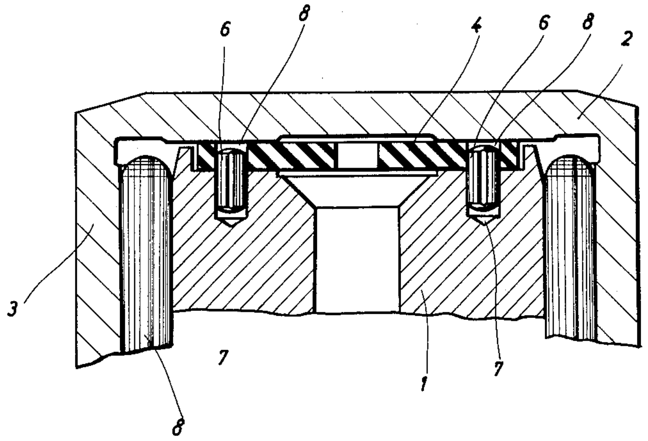
FIG. 2 is a section similar to that of FIG. 1 through a portion of a modified pivot bearing according to the invention.

The embodiment shown in FIG. 2 is very similar to that of FIG. 1 and, therefore, those parts of FIG. 2 which correspond to the parts of FIG. 1 have been designated with the same reference numerals as in FIG. 1. Thus, according to the arrangement of FIG. 2, the disc 4 is likewise mounted between the bottom 2 of the socket 3 and the end of the pivot 1. However, in contrast to the arrangement of FIG. 1, according to the modification of FIG. 2, two notched pins 6 are provided which are mounted in bores 7 in pivot 1 and extend into bores 8 in disc 4 so that the centered location of the disc 4 is definitely and clearly fixed.

It is, of course, to be understood that the present invention is, by no means, limited to the particular constructions shown in the drawing but also comprises any modifications within the scope of the appended claims.

What I claim is:

1. A pivot bearing, especially for universal joint shafts, in which the individual pivots are journalled in bearing bushings by means of needles and in which between the pivot end and the bottom of said bushing there is provided a flat bearing disc, characterized in that the pivot end is provided with a flat recess for receiving and centering said disc which comprises a synthetic material of polyamide.

2. A pivot bearing according to claim 1 characterized in that the disc is centered by pins mounted in the pivot end and extending in an axial direction.

3. A pivot bearing for use in universal joint shafts wherein a shaft adapted for rotation is journalled by needle bearings within a socket-shaped, one-piece bushing, said shaft having a terminal end thereof spaced apart from the corresponding inner face of said bushing by a thin lubricant saturated disc recessed within substantially the entire end area of said shaft and coaxial therewith, said disc being prevented from relative movement with said shaft by means of a plurality of pins extending in an axial direction through said disc into said shaft.

References Cited in the file of this patent

UNITED STATES PATENTS

| | | |
|---|---|---|
| 557,042 | Woodcock | Mar. 24, 1896 |
| 849,779 | Fuller | Apr. 9, 1907 |
| 1,454,777 | Walker | May 8, 1923 |
| 2,794,693 | Burkhalter et al. | June 4, 1957 |

OTHER REFERENCES

"Designing Fabricated Nylon Parts," by R. B. Zimerli, pub. in Machine Design, March 1954, pp. 153 through 159 relied upon.